(12) United States Patent
Qian et al.

(10) Patent No.: US 9,004,448 B2
(45) Date of Patent: Apr. 14, 2015

(54) VALVE AND VALVE CARTRIDGE ASSEMBLY THEREOF

(75) Inventors: Zuocheng Qian, Shanghai (CN); Fang Yuan, Shanghai (CN); Martin Thornhill, Birmingham (GB); Gino Lutzu, Zoetermeer (NL)

(73) Assignee: Shanghai Hongyan Returnable Transit Packagings Co., Ltd., Shanghai (CN)

( * ) Notice: Subject to any disclaimer, the term of this patent is extended or adjusted under 35 U.S.C. 154(b) by 0 days.

(21) Appl. No.: 13/992,834

(22) PCT Filed: Jan. 11, 2011

(86) PCT No.: PCT/CN2011/070175
§ 371 (c)(1),
(2), (4) Date: Sep. 10, 2013

(87) PCT Pub. No.: WO2012/075692
PCT Pub. Date: Jun. 14, 2012

(65) Prior Publication Data
US 2013/0341545 A1    Dec. 26, 2013

(30) Foreign Application Priority Data
Dec. 10, 2010 (CN) .......................... 2010 1 0583035

(51) Int. Cl.
*F16K 5/20* (2006.01)
*F16K 5/06* (2006.01)

(52) U.S. Cl.
CPC ............... *F16K 5/204* (2013.01); *F16K 5/0647* (2013.01); *F16K 5/20* (2013.01)

(58) Field of Classification Search
CPC .................................................. F16K 5/0647
USPC ............ 251/188, 314, 315.01, 158, 160, 161, 251/187, 192
See application file for complete search history.

(56) References Cited

U.S. PATENT DOCUMENTS 2,072,965 A * 3/1937 Robinson et al. ............. 251/188
3,064,938 A * 11/1962 Knox ............................ 251/171
(Continued)

FOREIGN PATENT DOCUMENTS

| CN | 1073247 | 6/1993 |
|---|---|---|
| CN | 1298070 | 6/2001 |

(Continued)

OTHER PUBLICATIONS

International Search Report for international application No. PCT/CN2011/070175, dated Sep. 8, 2011 (6 pages).
(Continued)

*Primary Examiner* — John K Fristoe, Jr.
*Assistant Examiner* — Christopher Ballman
(74) *Attorney, Agent, or Firm* — Hamre, Schumann, Mueller & Larson, P.C.

(57) ABSTRACT

A valve and valve cartridge assembly can provide an opening and closing operation with a low torque. The valve and valve cartridge assembly can be switched between a first transmission relationship and a second transmission relationship, and the first and second transmission relationships are formed between the top of the valve cartridge and a transmission device. The first transmission relationship is established so that the valve cartridge is driven to rotate axially. The second transmission relationship is established so that the transmission member drives the valve cartridge to carry out a squeeze sealing movement.

10 Claims, 4 Drawing Sheets

(56) References Cited

U.S. PATENT DOCUMENTS

| | | | | |
|---|---|---|---|---|
| 3,254,873 | A | * | 6/1966 | Knox .............................. 251/171 |
| 3,429,553 | A | * | 2/1969 | Trexler, Jr. et al. ........... 251/161 |
| 3,552,434 | A | | 1/1971 | Haenky |
| 3,746,302 | A | | 7/1973 | Larsen |
| 4,029,292 | A | * | 6/1977 | Kramer et al. ................. 251/163 |
| 4,141,536 | A | * | 2/1979 | Graham ......................... 251/161 |
| 4,203,460 | A | * | 5/1980 | Priese ............................ 137/240 |
| 4,442,996 | A | * | 4/1984 | Erwin ............................ 251/77 |
| 4,634,098 | A | * | 1/1987 | Varden .......................... 251/188 |
| 5,333,833 | A | * | 8/1994 | Reinicke ........................ 251/77 |
| 5,755,427 | A | | 5/1998 | Koskinas |
| 6,378,841 | B1 | * | 4/2002 | Russell ......................... 251/160 |

FOREIGN PATENT DOCUMENTS

| | | |
|---|---|---|
| CN | 1483954 | 3/2004 |
| CN | 2929383 | 8/2007 |
| CN | 201166141 | 12/2008 |
| CN | 102011887 | 4/2011 |
| CN | 201902691 | 7/2011 |
| JP | S51-2745 | 1/1976 |
| JP | 2006-300321 | 11/2006 |
| JP | 2009-243546 | 10/2009 |

OTHER PUBLICATIONS

Office Action from Japanese application No. 2013-542338, dated Nov. 18, 2014 (10 pages, including English translation).

* cited by examiner

VALVE AND VALVE CARTRIDGE ASSEMBLY THEREOF

FIELD OF INVENTION

The invention relates to a valve and valve cartridge assembly thereof.

BACKGROUND OF THE INVENTION

In order to optimize the nominal diameter, pressure, torque, life, and other technical parameters of the ball valve, in recent years, there are a wide variety of valve complex opening and closing mechanisms.

Chinese patent No. 200720082066 has disclosed a low-torque ball valve, which provides a low torque valve comprising a valve body, a valve ball, a valve seat, a bearing seat, a valve rod, a driving device, and a valve ball bearing connection. The patent has several disadvantages. The structure of the driving device is complex, and extremely occupies the external space of the valve body. The driving device involves many parts, resulting in the complexity of the assembling process. The rotation angle for opening or closing the valve is 180 degrees. The working space formed by the valve rod and the driving device requires a very high quality of sealing process, thus the traditional sealing methods and processes are likely to cause leakage. In addition, since the cost of manufacturing the driving device is very high, it does not conform to the purpose for economy and environment friendly.

There has recently developed a guide slot lifting rod ball valve at domestic and abroad. There provided on the valve rod a S-shaped guide slot, which engages with the guide pin, so that when the valve rod rises, it causes the ball to disengage from the valve seat. Then, the valve rod further rotates 90° counterclockwise and fully open the valve. When the valve rod is moving down, the ball rotates 90° clockwise, then being pressed towards the valve seat to close the valve. The shortcomings of the technology is that a long S-shaped guide slot being provided on the valve rod, thus, when the valve rotates for opening or closing, the valve rod needs to move up and down spirally along the guide slot, resulting in a huge space for the guide slot and a large rotation angle and other shortcomings.

Chinese Patent Application No. 99124192.4 has disclosed a structure for opening and closing a valve, which is a disk-shaped two-track rotary with deploy-close structure. The structure comprises a fixed disk, a rotating disk and a stop pin. When the external force drives the valve rod together with the rotating disk to move the stop pin, the stop pin rotates clockwise along the "arc" track of the fixed disk. When rotated to the "straight" track connected to the "arc" rail track, the rotating disk rotates clockwise further, and the stop pin deploys the surrounding of the fixed disk along the "straight" track of the fixed disk under the forced action by the "deploy-close" track of the rotating disk. At this time, the stop pin structure together with the valve sealing structure close to the valve seat, thus close the valve. When the valve rotates counter-clockwise together with the rotating disk, the stop pin together with the sealing structure move towards the centre of the fixed disk along the "straight" track of the fixed disk under the forced action by the "deploy-close" track of the rotating disk, and then rotate counter-clockwise along the "arc" track of the fixed disk to open the valve. The technical shortcoming of the patent is to use the "arc connected with straight line" track, which requires high precision and complex processing. Further, since the valve cartridge is a combined sphere, it is difficult to get a balanced preload force, resulting in damage to the valve cartridge and shortening the life of the valve.

Chinese Patent No. 200620105067 has disclosed an orbit plug valve, comprising a valve body, a valve cover, an operating member, a valve rod, a valve seat, a valve plug which together with the valve seat forming a conical surface sealing, and an orbital mechanism. The orbital mechanism comprises a track with two guide slots mounting on the neck portion of the valve plug and a plate with two guide pins inserting into said guide slots, as well as a lock nut and an adjusting ring for adjusting the mounting position of the track. The shortcomings of the present patent are that the transmission device structure is complex, and extremely occupy the external space of the valve body. Further the transmission device involves more parts, resulting in complicated assembly process. In addition, since the valve has a plug forming a cone surface sealing as well as a lock nut and an adjusting ring for adjusting the mounting position of the track, it must be adjusted several times, resulting in complex operation.

SUMMARY OF THE INVENTION

The object of the invention is to provide a valve and valve cartridge assembly thereof, which have advantages that the structure of the opening and closing mechanism is compact, easy to operate, the rotation angle being small and the torque being small when open the valve, and so on.

The valve cartridge assembly of the invention comprises a valve cartridge and a transmission device, wherein a recess is formed on the top of the valve cartridge; the transmission device is provided in the recess of the valve cartridge, and a first transmission relationship and a second transmission relationship are formed between the transmission device and the recess of the valve cartridge; the first transmission relationship is established so that the transmission device drives the valve cartridge to rotate axially; when the movement in the first transmission relationship is ended, the relationship between the transmission device and the valve cartridge switches from the first transmission relationship to the second transmission relationship; the second transmission relationship is established so that the transmission device drives the valve cartridge to carry out a squeeze movement, and the squeeze movement enables the valve cartridge to have a moving component at least in an axial direction.

The further characteristic of the valve cartridge assembly is that the transmission device is a transmission member, the transmission member being an one-piece member, the transmission member being at least partially positioned in the recess of the valve cartridge, the recess formed with a radially inwards protruding profile, the transmission member being formed with a radially outwards protruding profile, the transmission member further having elastic protruding ribs, there being a releasable connection relationship between the elastic protruding ribs and the inner wall of the recess, and the elastic protruding ribs being connected to the inner wall of the recess so as to have said first transmission relationship between the transmission member and the valve cartridge, the radially inwards protruding profile and the radially outwards protruding profile cooperating with each other so as to have said second relationship between the transmission member and the valve cartridge, the elastic protruding ribs being disengaged from the inner wall of the recess that the transmission member can rotate in the valve cartridge, thus to have the first transmission relationship or the second transmission relationship with the valve cartridge switchably.

The further characteristic of the valve cartridge assembly is that, the inner peripheral wall of the recess of the valve cartridge is formed with pits, the distal ends of the elastic protruding ribs of the transmission member being embedded into the pits and thus establishing said first transmission relationship between the transmission member and the valve cartridge.

The further characteristic of the valve cartridge assembly is that the radially inwards protruding profile is formed in the inner peripheral wall of the recess of the valve cartridge, and there being a limiting protrusion on the both sides of the radially inwards protruding profile, the elastic protruding ribs and the outwards protruding profile of the transmission member are formed on the outer circumferential wall of the transmission member.

The valve of the invention comprises a valve body, a valve seat, and the valve cartridge assembly mentioned above, the valve cartridge and the valve seat being disposed in the valve body, the bottom of the valve cartridge being supported in the valve body through a flexible connecting member, the flexible connecting member providing the valve cartridge with a freedom of rotation around an axis and a freedom of movement along the axial direction in relation to the valve body, and a position limiting and stopping structure being provided between the valve body and the valve cartridge in the direction of rotation of the valve cartridge so as to limit the valve cartridge to rotate after having aligned with the valve seat.

The further characteristic of the valve is that the transmission member has a central transmission hole, the central transmission hole being a spline hole, the driving output shaft of a driver splinedly engaged the central transmission hole, the spline hole having irregular shape so as to enable an assembly relationship between the driving output shaft of the driver and the central transmission hole.

The further characteristic of the valve is that the center of the recess has an elongated hole, the highest mating position between the radially inwards protruding profile and radially outwards protruding profile locating in the length direction of the elongated hole, the driving output shaft of the driver extending from the central transmission hole to the elongated hole.

The further characteristic of the valve is that the valve is a ball valve or a butterfly valve.

The further characteristic of the valve is that said driver is a valve rod, a mechanism is provided at the handle portion of the valve rod to prevent accidental opened.

The further characteristic of the valve is that said valve rod and the transmission device are one-piece member, and the transmission device is located at the distal end of the valve rod.

In the invention, a recess is formed on the top of the valve cartridge, the transmission device is provided in the recess of the valve cartridge, and a first transmission relationship and a second transmission relationship are formed between the transmission device and the recess of the valve cartridge, the first transmission relationship is established so that the transmission device drives the valve cartridge to rotate axially, when the movement in the first transmission relationship is ended, the relationship between the transmission device and the valve cartridge switches from the first transmission relationship to the second transmission relationship. The second transmission relationship is established so that the transmission device drives the valve cartridge to carry out a squeeze movement. The first transmission relationship causes the valve cartridge to rotate freely with low-torque to a position where the valve passageway is closed, the second transmission relationship forces the valve cartridge to move axially, in order to provide a pressure for closing the valve passageway. The design can realize a low-torque and small angle when opening and closing a valve.

The further characteristic of the valve or the valve cartridge is that when the transmission member and the valve cartridge is in the first transmission relationship, the transmission member being driven by a driver drives the valve cartridge, thus the valve cartridge can be rotated to switch the passageway of the valve body to be opened or closed. Once rotated to a position where the valve cartridge and the valve seat contact with each other so as to block the passageway of the valve body, the valve cartridge and the valve seat will not rotate anymore due to a position limiting and stopping structure. At this time, the driver will continue to drive the transmission member to rotate, thus the rotation of the transmission member will cause the connection between the protruding ribs and the recess to be disengaged, then the outwards protruding profile of the transmission member and the inwards protruding profile of the recess begin to engage with each other in order to have the transmission member and the valve cartridge to be in the second transmission relationship. The further rotation of the transmission member will allow axial movement of the valve cartridge, whereby a pressing force is transmitted to the valve cartridge and the valve seat, thereby to achieve the predetermined force required by sealing. There is no resistance between the valve seat and the valve cartridge during the rotation of the valve cartridge, the valve cartridge being in a suspension state, thus you can achieve the opening and closing operation of the whole ball valve with low torque.

According to the above-mentioned content of the present invention, the technical effect of the present invention are as following: the transmission device is adopted as one piece, thus reduce the number of parts and reduce the manufacturing cost; due to the use of elastic transmission device, the frictional resistance of the transmission is reduced; due to an axial displacement exits when transmission, the pretightening force between the valve cartridge and the valve seat increases, thus increasing the tightness of the valve.

Since the valve is compact in structure, the space is saved and it is suitable for small space. The external size of the valve body can be minimized. The technology is mature. And, the maintenance is simple.

Another technical effect of the present invention is that it is provided with a mechanism to prevent accidental opened additionally, thus preventing from being accidental opened when used in combination with a container or resulting in the leakage of the liquid due to vibration.

DETAILED DESCRIPTION

The implement of the invention is not limited to the following embodiments, and those skilled in the art will understand the invention from the spirit of the following embodiments. All the terms should be explained as broadly as possible based on the essence of the invention. For example, the valve rod is a part used to control the movement of the valve cartridge; the transmission device is a device used to transfer the operation intent of the operator for operating the valve cartridge, where the operation intent is to realize a first transmission working status and a second transmission working status by the rotation angle of the valve rod. The valve rod may be integral with the transmission device or be a separate structure.

Figure 1:
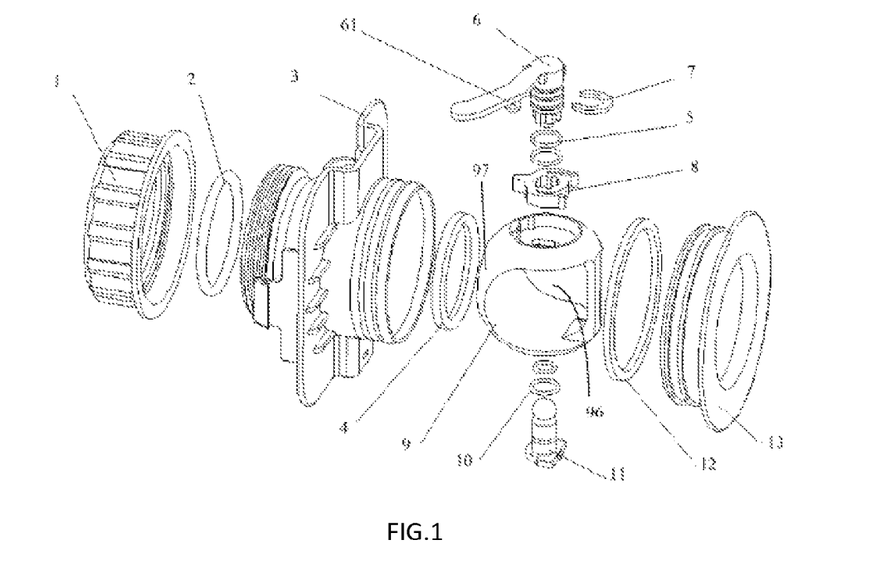
FIG. 1 is an exploded view of a ball valve.
Figure 2:
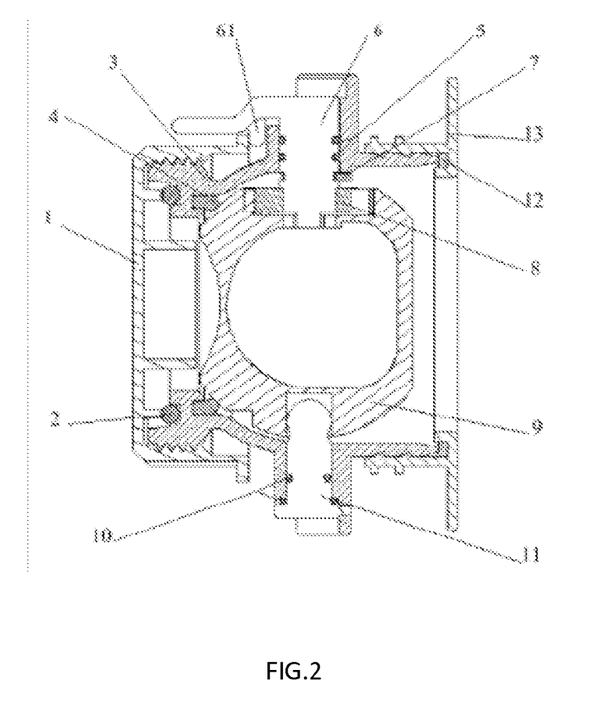
FIG. 2 is a sectional view of the ball valve.

As shown in FIG. 1 and FIG. 2, the ball valve comprises a valve cover 1, a sealing ring 2, a valve body 3, a valve seat 4, an O-ring seals 5, a handle or valve rod 6, clip 7, a transmission member 8, a spherical valve cartridge 9, an O-ring seals 10, and a connecting member 11. The left end of the valve body 3 is covered through the valve cover 1 and the sealing ring 2. The valve seat 4 is positioned within the valve body 3. The valve cartridge 9 is provided within the valve body 3 through the connecting member 11 disposed at its lower portion. The right end of the valve body 3 is connected with a pipe connector 13 to seal the valve cartridge within the valve body 3. An O-ring seals 12 is disposed between the pipe connector 13 and the valve body 3.

Figure 3:
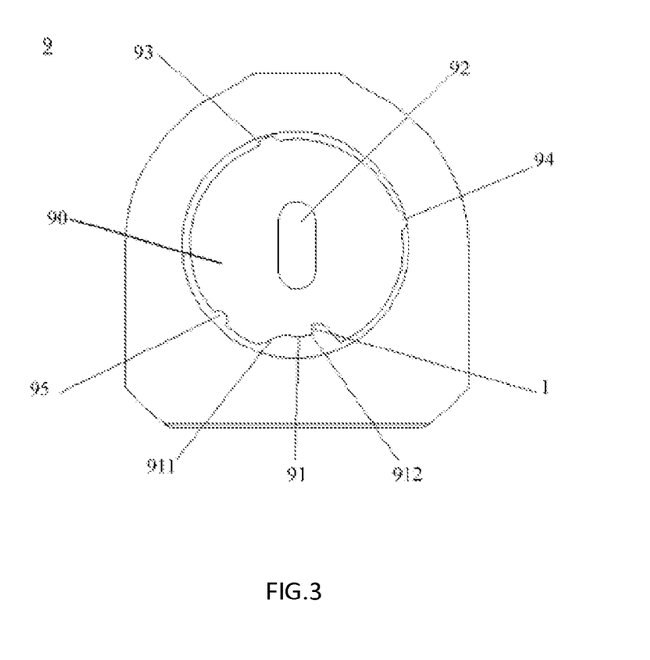
FIG. 3 is a top view of a valve cartridge.

As shown in FIG. 3, a recess 90 is formed on the top of the valve cartridge 9. The inner peripheral wall of the recess 90 is formed with an inwards protruding profile 91 projecting radially. The recess 90 is formed with an elongated hole 92 at its center. The inner peripheral wall of the recess 90 is also formed with limiting pits 93, 94 and a limiting protrusion 95.

Figure 4:
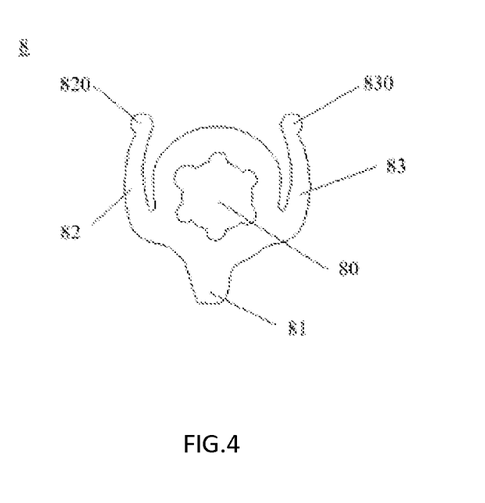
FIG. 4 is the plan view of a driving member.

As shown in FIG. 4, the transmission member 8 has a transmission hole (or a connecting hole) 80 located in the center of the transmission member 8, an outwards protruding profile 81 and two protruding ribs 82, 83. The distal ends 820, 830 of the protruding ribs 82, 83 correspond to the limiting pits 93, 94 respectively, with the distal ends 820, 830 embedded into the limiting pits 93, 94, so as to connect the protruding ribs 82, 83 to the inner circumferential wall of the recess 90. The protruding ribs 82, 83 and the inner circumferential wall of the recess 90 have releasable relationship, i.e. the protruding ribs 82, 83 may also be released from the limiting pits 93, 94.

Figure 5:
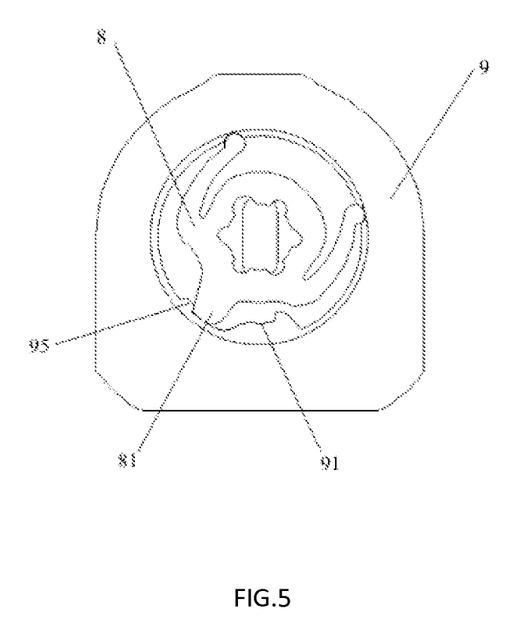
FIG. 5 is a schematic view of the valve cartridge assembly.
Figure 6:
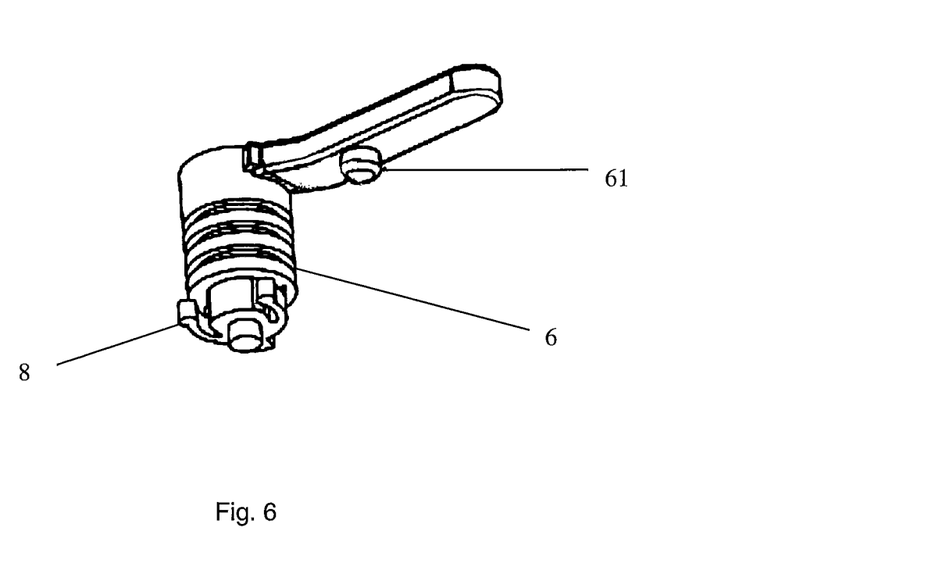
FIG. 6 is a perspective view of a valve rod and a transmission member being a one-piece member.

As shown in FIG. 5, since the transmission member 8 is placed within the recess 90 of the valve cartridge 9 and the two protruding ribs 82, 83 of the transmission member 8 are elastic members, the two protruding ribs 82, 83 being pressed and then applying a certain amount elastic pressure to the inner circumferential wall of the recess 90, at the same time, the distal ends 820, 830 of the two protruding ribs 82, 83 being embedded into the two limiting pits 93, 94 of the inner circumferential wall of the recess 90, therefore, in the case of a small resistance to the rotation of the valve cartridge 9, the transmission member 8 will drive the valve cartridge 9 to rotate synchronously through the cooperation of the ends 820, 830 of the two protruding ribs 82, 83 and the two pits 93, 94 of the recess 90. Referring to FIG. 2, after the valve rod 6 passing through the holes in the upper portion of the valve body 3, it passed through the transmission hole (or the connecting hole) 80 of the transmission member 8, and is inserted into the elongated hole 92 of the recess 90 of the valve cartridge 9. The space between the valve rod 6 and the wall of a hole of valve body 3 is sealed by the O-ring seals 5, the valve rod 6 being snapped with the clip 7, the clip 7 being located at the position where the valve rod 6 just passes through the hole of the upper portion of the valve body 3 and playing a role in position limiting and stopping to the valve rod 6, thus the valve rod 6 can not be pulled out from the valve body 3. The valve rod 6 and the transmission hole 80 is spline-connected in order to achieve the transmission of a movement, the lower end of the valve rod 6 being accommodated in the elongated hole 92. As shown in FIG. 4, the transmission hole (or the connecting hole) 80 is a spline hole with irregular shape, thus the fitting position between the shaft portion of the valve rod 6 and transmission hole 80 is unique, resulting in ensuring that the valve rod 6 cannot be wrongly assembled. The mainly effect of the cooperation between the elongated hole 92 and the lower end of the valve rod 6 is to guide the axial movement (i.e., a radial motion along the elongated hole) of the valve cartridge forcibly, which will be described in the following.

As can be seen from FIG. 4, the transmission member 8 is an one-piece member, the structure being simple, and the operation for installing to the recessed 90 is also convenient.

Connecting member 11 is a connecting member which may provide the valve cartridge 9 with a freedom of rotation around the vertical axis and a freedom of movement along the radial direction of the valve body, for example an universal connecting member or an universal joint.

As shown in FIG. 1, the valve cartridge 9 has a through hole 96, when the through hole 96 is coaxial to the passageway direction of the valve body 3, the valve cartridge 9 opens the valve, and when the valve cartridge 9 is rotated 90 degrees, the valve cartridge 9 blocks the passageway of the valve body 3, thus close the valve. When the valve is closed, a certain amount of pressing force between the valve cartridge 9 and the valve seat 4 should be needed to ensure seal.

When the valve is switched from the open state to the closed state, the valve rod 6 is rotated and drives the transmission member 8 by means of engaging with the profile of the transmission hole 80. When the valve is in the open state, the valve cartridge 9 does not contact with the valve seat 4, the rotation resistance is the frictional force from the revolute pair of the connecting member 11, thus the rotation resistance is very small, almost can be neglected. At this time, the transmission member 8 drives the valve cartridge 9 to rotate through the connection between the distal ends 820, 830 of the two protruding ribs 82, 83 and the two pits 93, 94 of the recess 90, so that the valve cartridge 9 will rotate around an axis while being supported by the connecting member 11. After the valve cartridge 9 has been rotated about 90°, the closed end 97 of the valve cartridge 9 contacts or aligned with the valve seat 4. Further, there are position limiting and stopping structures at the bottom of the valve cartridge 9 and the valve body 3. The position limiting and stopping structures make the valve cartridge 9 to rotate only in a rotational range of 90 degrees within the valve body 3. The position limiting and stopping structures may be a part of bottom of the valve cartridge 9 being embedded in a recess within the bottom of the valve body 3, for example. After the valve cartridge 9 has been rotated about 90 degrees, the rotational torque on the valve rod 6 increases, such that the outwards protruding profile 81 is rotated along the inwards protruding profile 91 (rising as seen in Figs), thus the valve cartridge 9 moves radially (with axial component of movement) or moves axially at the same time while being supported by the connecting member 11. At this time, the lower end of the handle 6 and the elongated hole 92 of the recess 90 play a compulsory guide for the radial movement of the valve cartridge 9. When the outwards protruding profile 81 rotates from the starting portion 911 of the inwards protruding profile 91 to the stopping portion 912, the valve cartridge 9 applies a predetermined pressure to the valve seat 4 and the valve cartridge and the valve seat contact with each other with the predetermined pressure, closing the passageway of the valve, so that the valve is closed.

The shank portion of the valve rod 6 is provided with a protruding block 61, as shown in FIG. 1. When the valve cartridge 9 is rotated to a position where the passageway of the valve body 3 is closed, as shown in FIG. 2, the protruding block 61 and valve cover 1 engage with each other, thus preventing the valve rod 6 from being incorrect operated and rotated reversely, the protruding block 61 plays the role of preventing from being accidental opened.

In the previous embodiments, the method of making the valve cartridge 9 to contact with the valve seat 4 and press it in order to achieve sealing comprises: firstly rotate the valve cartridge without resistance, then apply pressure after rotating to a position in order to make the valve cartridge 9 to contact with the valve seat 4 with pressure, so that it can achieve the opening and closing of the valve body with low torque, and due to the transmission member 8 is an one-piece member, thus the structure is simple. Further, due to the transmission member 8 is placed in the recess of the upper part of the valve cartridge; a small space is occupied, which will help the valve to obtain a large nominal diameter.

When need to open the valve, the valve rod 6 is rotated in reverse and drives the transmission member 8 to rotate in reverse. The valve cartridge 9 will not rotate along with the transmission member 8 due to a greater frictional force existed between the valve cartridge 9 and the valve seat 4 which contact with each other with a pressure therebetween. The outwards protruding profile 81 of the transmission member 8 rotates from the stopping portion 912 to the start portion 911 of the inwards protruding profile 91, the protruding ribs 82, 83 providing a reset force, so that the transmission member 8 and the recess 90 is reset to its initial position, the pressure applied to the valve cartridge 9 therefore disappear, then the valve cartridge 9 and the valve seat 4 separate with each other, the frictional force between them thus disappeared too, and the valve cartridge 9 is no longer inclined or axially reset. There is also provided on the inner peripheral wall of the recess 90 with a limiting protrusion 95, as shown in FIG. 5. When the transmission member 8 is rotated in reverse, as the outwards protruding profile 81 comes into contact with the limiting protrusion 95, the outwards protruding profile 81 can not rotate in reverse in relation to the valve cartridge 9 anymore, meanwhile the distal ends of the two protruding ribs are also embedded into the pits of the inner circumferential wall of the recess, thus the interaction between the limiting protrusion 95 and the outwards protruding profile 81 as well as the interaction between the protruding ribs 82, 83 and the pits of the inner circumferential wall of the recess 90 will make the transmission member 8 drive the valve cartridge 9 to rotate 90 degrees in reverse to let the passageway of the valve body be in opened state.

Due to the spherical valve cartridge is not in contact with the valve seat or the valve body and is in a suspension state during the rotation for the opening or closing the valve cartridge, the frictional force from their contact is reduced, and the torque is reduced. Only the instant when the valve body is closed, the valve rod is turned and drives the transmission member to squeeze the spherical valve cartridge radially, then the spherical valve cartridge moves in the radial position, making the spherical valve cartridge against to the valve seat closely, so that the sealing of the valve is better.

Although the previous embodiments take the ball valve as an example, the ball valve can also be replaced by other valves, such as butterfly valve. The valve cartridge and the transmission member constituting the valve cartridge assembly is applicable not only to the valve rod, but also to other drives, and due to the optimization of the transmission structure of the valve cartridge assembly, the valve can not only be rotated with low torque in the open state, and also makes the structure simple.

As a variation example of the embodiment shown in FIGS. 1 to 4, the valve rod 6 may be integral with the transmission member 8 through injection moulding with the transmission member 8 as the distal end of the valve rod 6.

The invention claimed is:

1. A valve cartridge assembly comprising:
a valve cartridge and a transmission device,
wherein a recess is formed on the top of the valve cartridge, the recess being formed with a radially inwardly protruding profile,
wherein said transmission device includes a transmission member, the transmission member being formed with a radially outwardly protruding profile and further having elastic protruding ribs, the transmission member being at least partially positioned in the recess of the valve cartridge,
wherein a releasable engagement is formed between the elastic protruding ribs and an inner wall of the recess,
wherein the elastic protruding ribs are engaged to the inner wall of the recess so as to have a first transmission relationship between the transmission member and the valve cartridge, the first transmission relationship being configured to allow the transmission member to drive the valve cartridge to rotate axially,
wherein the radially inwardly protruding profile and the radially outwardly protruding profile cooperate with each other so as to have a second transmission relationship between the transmission member and the valve cartridge, the second transmission relationship being configured to allow the transmission member to drive the valve cartridge to carry out a squeeze movement,
wherein the squeeze movement enables the valve cartridge to have a moving component at least in an axial direction, and enables the elastic protruding ribs to be disengaged from the inner wall of the recess such that the transmission member is rotatable in the valve cartridge, allowing the valve cartridge assembly to switch between the first transmission relationship and the second transmission relationship, and
wherein when the movement in the first transmission relationship is ended, the relationship between the transmission member and the valve cartridge switches from the first transmission relationship to the second transmission relationship.

2. The valve cartridge assembly as claimed in claim 1, wherein the transmission member is a one-piece member.

3. The valve cartridge assembly as claimed in claim 2, wherein an inner peripheral wall of the recess of the valve cartridge is formed with pits, distal ends of the elastic protruding ribs of the transmission member being embedded into the pits and thus allow the valve cartridge assembly to be switched to the first transmission relationship.

4. The valve cartridge assembly as claimed in claim 3, wherein the radially inwardly protruding profile is formed in the inner peripheral wall of the recess of the valve cartridge, and there being a limiting protrusion on both sides of the radially inwardly protruding profile, the elastic protruding ribs and the outwardly protruding profile of the transmission member are formed on an outer circumferential wall of the transmission member.

5. A valve comprising a valve body, a valve seat and the valve cartridge assembly as claimed in claim 1, the valve cartridge and the valve seat being disposed in the valve body, the valve cartridge assembly and the valve seat can be contacted in pressure so as to close a passageway of the valve body or be separated from each other so as to open the passageway of the valve body, a bottom of the valve cartridge being supported in the valve body through a connecting member, the connecting member providing the valve cartridge with a freedom of rotation around an axis and a freedom of movement along the axial direction in relation to the valve body, and a position limiting and stopping structure being provided between the valve body and the valve cartridge in the direction of rotation of the valve cartridge so as to limit the valve cartridge to rotate after having aligned with the valve seat.

6. The valve as claimed in claim 5, wherein the transmission member has a central transmission hole, the central transmission hole is a spline hole, a driving output shaft of a driver splinedly engaged with the central transmission hole, the spline hole having an irregular shape so as to enable an assembly relationship between the driving output shaft of the driver and the central transmission hole.

7. The valve as claimed in claim 6, wherein a center of the recess has an elongated hole, a the highest mating position between the radially inwardly protruding profile and radially outwardly protruding profile locating in a length direction of the elongated hole, the driving output shaft of the driver extends from the central transmission hole to the elongated hole.

8. The valve as claimed in claim 5, wherein the valve is a ball valve or a butterfly valve.

9. The valve as claimed in claim 6, wherein said driver is a valve rod, a mechanism is provided at a handle portion of the valve rod to prevent it from being accidental opened.

10. The valve as claimed in claim 9, wherein said valve rod and the transmission member are a one-piece member and the transmission device is located at a distal end of the valve rod.

* * * * *